(12) United States Patent
Liu et al.

(10) Patent No.: US 8,972,469 B2
(45) Date of Patent: Mar. 3, 2015

(54) MULTI-MODE COMBINED ROTATOR

(75) Inventors: Fang Liu, Sunnyvale, CA (US); Honkai (John) Tam, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 747 days.

(21) Appl. No.: 13/174,151

(22) Filed: Jun. 30, 2011

(65) Prior Publication Data

US 2013/0007080 A1 Jan. 3, 2013

(51) Int. Cl.
*G06F 7/00* (2006.01)
*G06F 5/01* (2006.01)

(52) U.S. Cl.
CPC .................................... *G06F 5/01* (2013.01)
USPC ....................................................... 708/209

(58) Field of Classification Search
None
See application file for complete search history.

(56) References Cited

U.S. PATENT DOCUMENTS

| | | | |
|---|---|---|---|
| 4,839,839 A | 6/1989 | Tokumaru et al. | |
| 4,931,971 A | 6/1990 | Cook et al. | |
| 5,526,296 A | 6/1996 | Nakahara et al. | |
| 5,553,010 A | 9/1996 | Tanihira et al. | |
| 5,745,393 A | 4/1998 | Wong | |
| 5,844,827 A | 12/1998 | Wong | |
| 5,896,305 A | 4/1999 | Bosshart et al. | |
| 5,926,070 A | 7/1999 | Barron et al. | |
| 5,935,239 A | 8/1999 | Narayan | |
| 5,948,050 A | 9/1999 | Diamondstein et al. | |
| 5,995,747 A | 11/1999 | Guttag et al. | |
| 6,308,189 B1 | 10/2001 | Nguyen | |
| 6,654,774 B1 | 11/2003 | Dhablania et al. | |
| 6,738,792 B1 | 5/2004 | Muthusamy | |
| 7,409,415 B2 | 8/2008 | Bosshart | |
| 2002/0053015 A1 | 5/2002 | Tan et al. | |
| 2003/0131030 A1 | 7/2003 | Sebot et al. | |
| 2007/0088772 A1 | 4/2007 | Nunes et al. | |

OTHER PUBLICATIONS

Hayter, Mark; "Zen and the Art of SOC Design;" Microprocessor Summit, Apr. 2006, Session MPS-960 High End Processors, P.A. Semi, Inc.; pp. 1-14.

Keller, James B.; "The PWRficient Processor Family;" PA Semi, Oct. 2005; pp. 1-31.

*Primary Examiner* — Michael D Yaary
(74) *Attorney, Agent, or Firm* — Rory D. Rankin; Meyertons, Hood, Kivlin, Kowert & Goetzel, P.C.

(57) ABSTRACT

A system and method for efficiently rotating data in a processor for multiple operand sizes. A processor comprises a rotator configured to support multiple operand sizes. The rotator receives a rotate amount and an input operand with a size less than a maximum operand size supported by the processor. The rotator generates a mask with a same size as the received input operand. The mask comprises a number of asserted most-significant bits equal to the rotate amount. The remaining bits in the mask are deasserted. For a given rotation result bit position with an associated asserted mask bit, the rotator selects a value in the input operand at a bit position with a distance from the given result bit position equal to the rotate amount plus a difference between the maximum operand size supported by the processor and the input operand size.

20 Claims, 8 Drawing Sheets

MULTI-MODE COMBINED ROTATOR

BACKGROUND OF THE INVENTION

1. Field of the Invention

This invention relates to computing systems, and more particularly, to efficiently rotating data for multiple modes of a processor.

2. Description of the Relevant Art

The geometric dimensions of devices and metal routes on each generation of processor cores continue to decrease. Superscalar designs increase the density of integrated circuits (ICs) on a die with multiple pipelines, larger caches, and more complex logic. Cross-capacitance effects grow with decreasing geometric dimensions. Cross-capacitance increases the power consumption and noise effects on the chip. The noise effects increase the propagation delays of signals on a chip. Wide buses typically increase noise effects as geometric dimensions decrease and lines are brought closer together.

Ideally, every clock cycle produces useful execution of an instruction for each stage of a pipeline. An integer execution unit (IEU), or an execution core, executes several single-cycle instructions, such as addition, incrementing, subtraction, shifting and rotation. However, one or more of these instructions may become a critical path for the processor as the geometric dimensions decrease and the operational frequency increases.

The rotation of data is typically used for manipulating data fields such as data extraction, insertion and alignment. For example, data misalignment occurs in cached processor designs. Typically, when a misalignment is detected, two reads of consecutive caches lines are performed followed by an alignment operation to obtain the requested data. In addition, a rotate unit within an execution core may be configured to support of different operand sizes. In one example, a 64-bit processor achieves instruction set architecture legacy when the 64-bit processor is configured to support 32-bit instructions. In such a case, the processor may be configured to support rotations of both 64 and 32 bit operands.

One approach for processor to support both 64 bit and 32 bit rotations, is to include both a 32-bit rotator and a 64-bit rotator within the execution core(s). However, this solution consumes on-die real estate by having two rotators and may also add additional delay by adding a 2:1 mux to the critical path to select an appropriate result. A second approach is to detect a 32-bit rotate and in response duplicate the 32-bit rotate data inputs and send them to both the higher order (most significant) 32 bits and the lower order 32 bits of the 64-bit rotator. However, this second solution may increase the data input load and reduce the speed of the rotation.

In view of the above, efficient methods and mechanisms for efficiently rotating data for multiple modes of a processor are desired.

SUMMARY OF EMBODIMENTS OF THE INVENTION

Systems and methods for efficiently rotating data of different sizes with a single rotator are contemplated.

In one embodiment, a processor includes a rotator configured to support multiple modes, where each mode rotates an input operand of a different size. For example, a rotator may support rotations of both 32-bit and 64-bit operands. For a given rotate instruction, the rotator may receive a rotate amount and a data input operand. In one example, the input operand has a size of 32 bits and the processor supports 64-bit computations. As part of a rotate operation, a mask may be generated with bits to indicate whether a corresponding operand bit requires special treatment during the rotation. For a right rotate operation, the mask may have a number of most-significant bits equal to the rotate amount set to indicate an adjustment is to be performed during rotation. The adjustment is needed as these right shifted bits will rotate beyond the rightmost boundary of the operand, and through the upper 32 bits of the 64 bits of the rotator to reach their final destination. The remaining bits in the mask may not indicate such an adjustment is to be performed. For example, for a right rotate amount of 23 bits, the most-significant 23 bits of a 32-bit mask may be set. The remaining 9 bits of the 32-bit mask may not be set. For a left rotate, the least significant bits of the mask may be set to indicate such an adjustment.

For a given rotation result bit position, the rotator may detect an associated mask bit does not indicate an adjustment to the rotation is to be performed. In this case, the rotator may select a value in the input operand at a bit position with a distance from the given result bit position equal to the rotate amount. For example, for bit position 3 of the rotation result, the rotator may select for output a binary value at bit position 26 of the input operand. For a different rotation bit position, the rotator may detect an associated mask bit does indicate an adjustment to the rotation is to be performed. In this case, the rotator may select a value in the input operand at a bit position with a distance from the given result bit position equal to the rotate amount plus an additional amount. The additional amount may be equal to a difference between a larger operand size supported by the processor and the input operand size.

These and other embodiments will be further appreciated upon reference to the following description and drawings.

Figure 1:
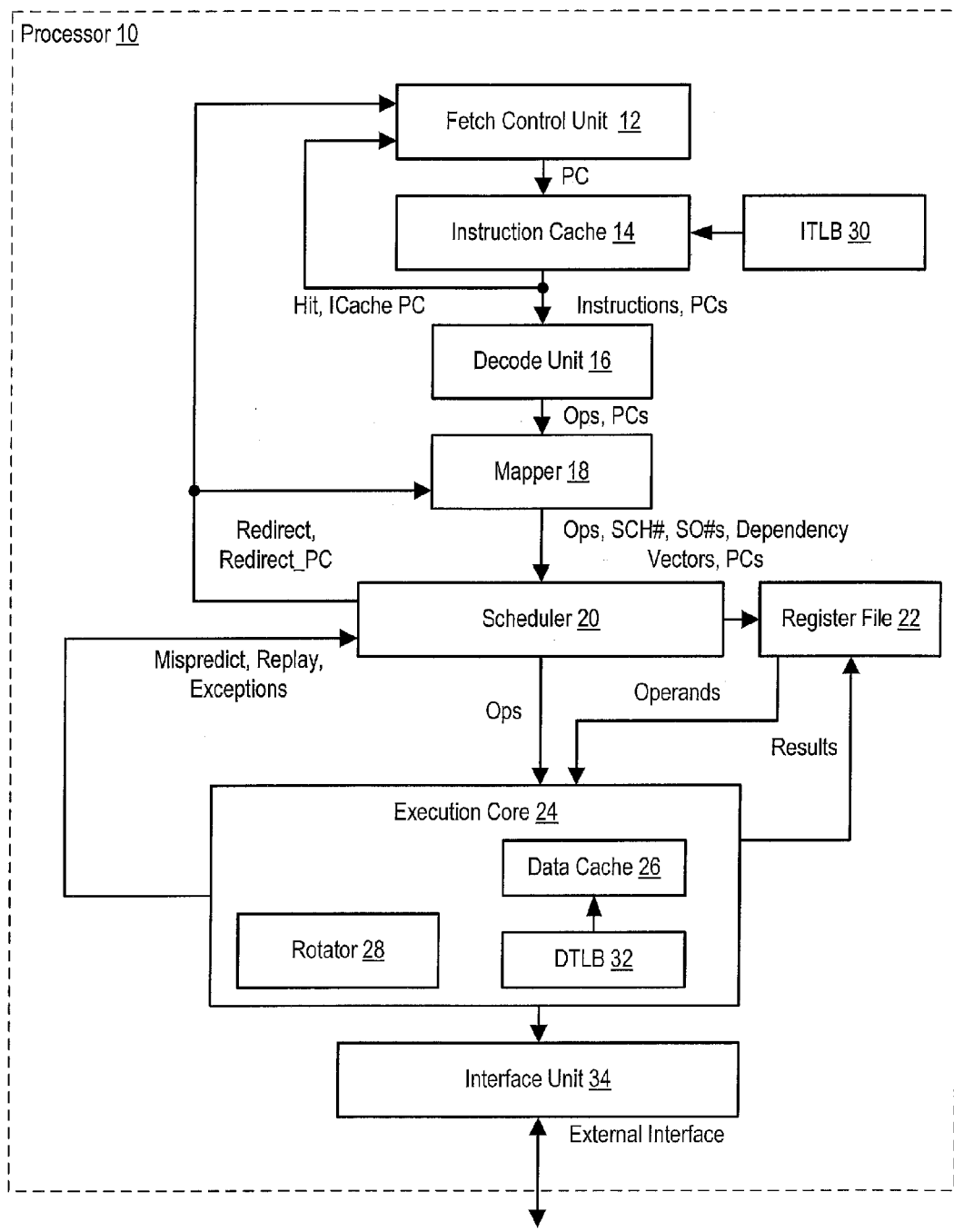
FIG. 1 is a generalized block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, a generalized block diagram illustrating one embodiment of a processor 10 is shown. In the illustrated embodiment, the processor 10 includes a fetch control unit 12, an instruction cache 14, a decode unit 16, a mapper 18, a scheduler 20, a register file 22, an execution core 24, and an interface unit 34. The fetch control unit 12 is coupled to provide a program counter address (PC) for fetching from the instruction cache 14. The instruction cache 14 is coupled to provide instructions (with PCs) to the decode unit 16, which is coupled to provide decoded instruction operations (ops, again with PCs) to the mapper 18. The instruction cache 14 is further configured to provide a hit indication and an i-cache PC to the fetch control unit 12. The mapper 18 is coupled to provide ops, a scheduler number (SCH#), source operand numbers (SO#s), one or more dependency vectors, and PCs to the scheduler 20. The scheduler 20 is coupled to receive replay, mispredict, and exception indications from the execution core 24, is coupled to provide a redirect indication and redirect PC to the fetch control unit 12 and the mapper 18, is coupled to the register file 22, and is coupled to provide ops for execution to the execution core 24. The register file is coupled to provide operands to the execution core 24, and is coupled to receive results to be written to the register file 22 from the execution core 24. The execution core 24 is coupled to the interface unit 34, which is further coupled to an external interface of the processor 10.

Fetch control unit 12 may be configured to generate fetch PCs for instruction cache 14. In some embodiments, fetch control unit 12 may include one or more types of branch predictors. For example, fetch control unit 12 may include indirect branch target predictors configured to predict the target address for indirect branch instructions, conditional branch predictors configured to predict the outcome of conditional branches, and/or any other suitable type of branch predictor. During operation, fetch control unit 12 may generate a fetch PC based on the output of a selected branch predictor. If the prediction later turns out to be incorrect, fetch control unit 12 may be redirected to fetch from a different address. When generating a fetch PC, in the absence of a non-sequential branch target (i.e., a branch or other redirection to a non-sequential address, whether speculative or non-speculative), fetch control unit 12 may generate a fetch PC as a to sequential function of a current PC value. For example, depending on how many bytes are fetched from instruction cache 14 at a given time, fetch control unit 12 may generate a sequential fetch PC by adding a known offset to a current PC value.

The instruction cache 14 may be a cache memory for storing instructions to be executed by the processor 10. The instruction cache 14 may have any capacity and construction (e.g. direct mapped, set associative, fully associative, etc.). The instruction cache 14 may have any cache line size. For example, 64 byte cache lines may be implemented in an embodiment. Other embodiments may use larger or smaller cache line sizes. In response to a given PC from the fetch control unit 12, the instruction cache 14 may output up to a maximum number of instructions. It is contemplated that processor 10 may implement any suitable instruction set architecture (ISA), such as, e.g., the ARM™, PowerPC™, or x86 ISAs, or combinations thereof.

In some embodiments, processor 10 may implement an address translation scheme in which one or more virtual address spaces are made visible to executing software. Memory accesses within the virtual address space are translated to a physical address space corresponding to the actual physical memory available to the system, for example using a set of page tables, segments, or other virtual memory translation schemes. In embodiments that employ address translation, the instruction cache 14 may be partially or completely addressed using physical address bits rather than virtual address bits. For example, instruction cache 14 may use virtual address bits for cache indexing and physical address bits for cache tags.

In order to avoid the cost of performing a full memory translation when performing a cache access, processor 10 may store a set of recent and/or frequently used virtual-to-physical address translations in a translation lookaside buffer (TLB), such as Instruction TLB (ITLB) 30. During operation, ITLB 30 (which may be implemented as a cache, as a content addressable memory (CAM), or using any other suitable circuit structure) may receive virtual address information and determine whether a valid translation is present. If so, ITLB 30 may provide the corresponding physical address bits to instruction cache 14. If not, ITLB 30 may cause the translation to be determined, for example by raising a virtual memory exception.

The decode unit 16 may generally be configured to decode the instructions into instruction operations (ops). Generally, an instruction operation may be an operation that the hardware included in the execution core 24 is capable of executing. Each instruction may translate to one or more instruction operations which, when executed, result in the operation(s) defined for that instruction being performed according to the instruction set architecture implemented by the processor 10. In some embodiments, each instruction may decode into a single instruction operation. The decode unit 16 may be configured to identify the type of instruction, source operands, etc., and the decoded instruction operation may include the instruction along with some of the decode information. In other embodiments in which each instruction translates to a single op, each op may simply be the corresponding instruction or a portion thereof (e.g. the opcode field or fields of the instruction). In some embodiments in which there is a one-to-one correspondence between instructions and ops, the decode unit 16 and mapper 18 may be combined and/or the decode and mapping operations may occur in one clock cycle. In other embodiments, some instructions may decode into multiple instruction operations. In some embodiments, the decode unit 16 may include any combination of circuitry and/or microcoding in order to generate ops for instructions. For example, relatively simple op generations (e.g. one or two ops per instruction) may be handled in hardware while more extensive op generations (e.g. more than three ops for an instruction) may be handled in microcode.

Ops generated by the decode unit 16 may be provided to the mapper 18. The mapper 18 may implement register renaming to map source register addresses from the ops to the source operand numbers (SO#s) identifying the renamed source registers. Additionally, the mapper 18 may be configured to assign a scheduler entry to store each op, identified by the SCH#. In an embodiment, the SCH# may also be configured to identify the rename register assigned to the destination of the op. In other embodiments, the mapper 18 may be configured to assign a separate destination register number. Additionally, the mapper 18 may be configured to generate dependency vectors for the op. The dependency vectors may identify the ops on which a given op is dependent. In an embodiment, dependencies are indicated by the SCH# of the corresponding ops, and the dependency vector bit positions may correspond to SCH#s. In other embodiments, dependencies may be recorded based on register numbers and the dependency vector bit positions may correspond to the register numbers.

The mapper 18 may provide the ops, along with SCH#, SO#s, PCs, and dependency vectors for each op to the scheduler 20. The scheduler 20 may be configured to store the ops in the scheduler entries identified by the respective SCH#s, along with the SO#s and PCs. The scheduler may be configured to store the dependency vectors in dependency arrays that evaluate which ops are eligible for scheduling. The scheduler 20 may be configured to schedule the ops for execution in the execution core 24. When an op is scheduled, the scheduler 20 may be configured to read its source operands from the register file 22 and the source operands may be provided to the execution core 24. The execution core 24 may be configured to return the results of ops that update registers to the register file 22. In some cases, the execution core 24 may forward a result that is to be written to the register file 22 in place of the value read from the register file 22 (e.g. in the case of back to back scheduling of dependent ops).

The execution core 24 may also be configured to detect various events during execution of ops that may be reported to the scheduler. Branch ops may be mispredicted, and some load/store ops may be replayed (e.g. for address-based conflicts of data being written/read). Various exceptions may be detected (e.g. protection exceptions for memory accesses or for privileged instructions being executed in non-privileged mode, exceptions for no address translation, etc.). The exceptions may cause a corresponding exception handling routine to be executed.

The execution core 24 may be configured to execute predicted branch ops, and may receive the predicted target address that was originally provided to the fetch control unit 12. The execution core 24 may be configured to calculate the target address from the operands of the branch op, and to compare the calculated target address to the predicted target address to detect correct prediction or misprediction. The execution core 24 may also evaluate any other prediction made with respect to the branch op, such as a prediction of the branch op's direction. If a misprediction is detected, execution core 24 may signal that fetch control unit 12 should be redirected to the correct fetch target. Other units, such as the scheduler 20, the mapper 18, and the decode unit 16 may flush pending ops/instructions from the speculative instruction stream that are subsequent to or dependent upon the mispredicted branch.

The execution core 24 may include a data cache 26, which may be a cache memory for storing data to be processed by the processor 10. Like the instruction cache 14, the data cache 26 may have any suitable capacity, construction, or line size (e.g. direct mapped, set associative, fully associative, etc.). Moreover, the data cache 26 may differ from the instruction cache 14 in any of these details. As with instruction cache 14, in some embodiments, data cache 26 may be partially or entirely addressed using physical address bits. Correspondingly, a data TLB (DTLB) 32 may be provided to cache virtual-to-physical address translations for use in accessing the data cache 26 in a manner similar to that described above with respect to ITLB 30. It is noted that although ITLB 30 and DTLB 32 may perform similar functions, in various embodiments they may be implemented differently. For example, they may store different numbers of translations and/or different translation information.

The execution core 24 may include several computation units that perform at least addition, subtraction, shifting, bitwise logic operations, rotation, and/or other functions. In the example shown, a rotator (unit) 28 is depicted. In various embodiments, rotator 28 is configured to perform bitwise rotations. As is known to those skilled in the art, a bitwise rotation is often implemented as a form of circular shift operation. In such embodiments, the bits of an operand are "rotated" either in a left or a right direction as if the left and right ends of an associated register storing the operand are joined. A bitwise value that is shifted in on the right during a left-shift is the bitwise value that was shifted out on the left, and vice versa. The rotation operation is used when retention of the bits is valuable, such as during cache line data alignment, digital cryptography, or otherwise. In some embodiments, rotator 28 may be configured to perform rotate operations on operands of differing sizes. For example, rotator 28 may be configured to perform rotations on both 32-bit and 64-bit operands. These and other embodiments will be discussed in greater detail below.

The register file 22 may generally include any set of registers usable to store operands and results of ops executed in the processor 10. In some embodiments, the register file 22 may include a set of physical registers and the mapper 18 may be configured to map the logical registers to the physical registers. The logical registers may include both architected registers specified by the instruction set architecture implemented by the processor 10 and temporary registers that may be used as destinations of ops for temporary results (and sources of subsequent ops as well). In other embodiments, the register file 22 may include an architected register set containing the committed state of the logical registers and a speculative register set containing speculative register state.

The interface unit 24 may generally include the circuitry for interfacing the processor 10 to other devices on the external interface. The external interface may include any type of interconnect (e.g. bus, packet, etc.). The external interface may be an on-chip interconnect, if the processor 10 is integrated with one or more other components (e.g. a system on a chip configuration). The external interface may be on off-chip interconnect to external circuitry, if the processor 10 is not integrated with other components. In various embodiments, the processor 10 may implement any instruction set architecture.

Figure 2:
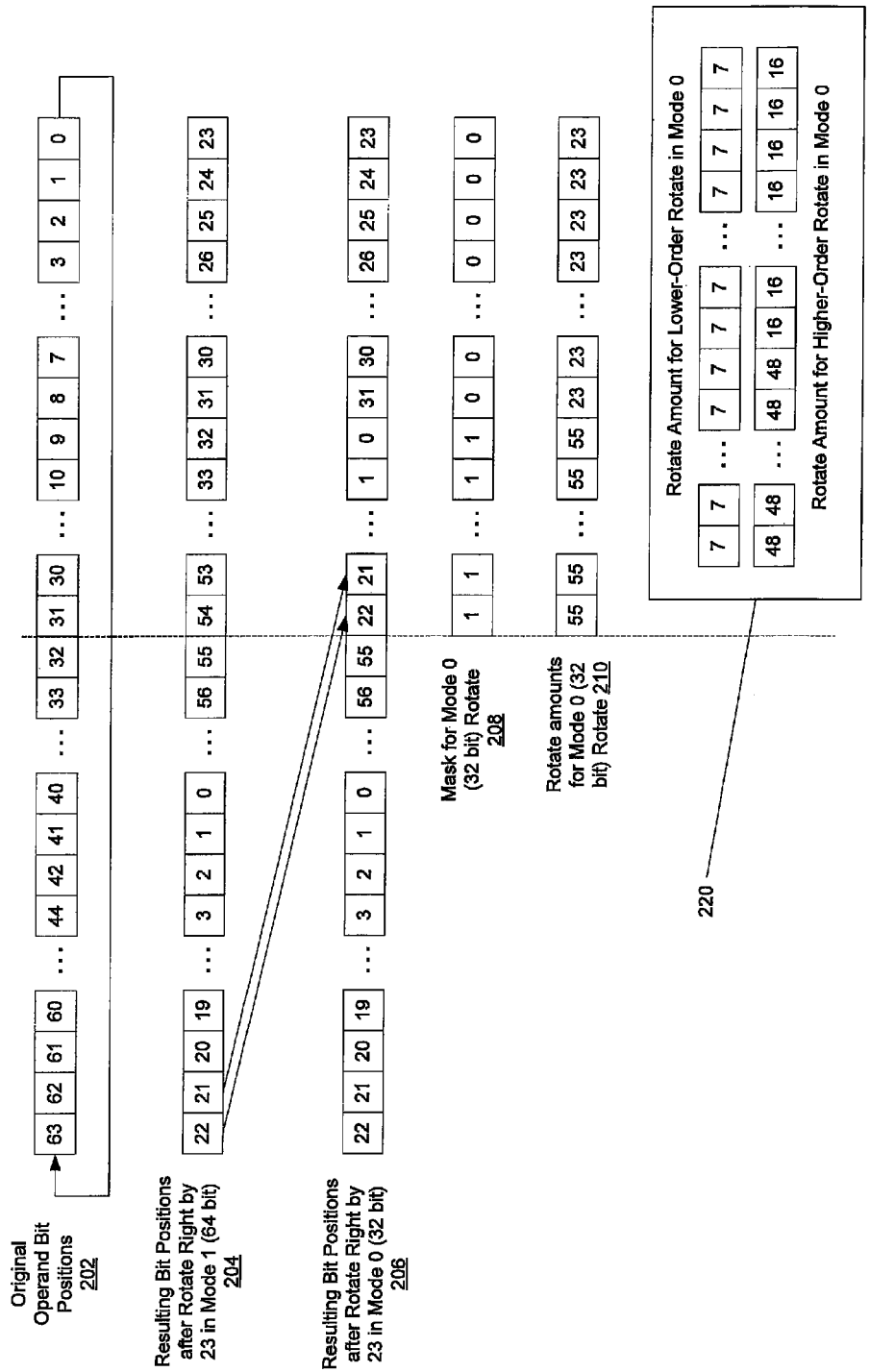
FIG. 2 is a generalized block diagram of one embodiment of a dual-mode rotation on a single rotator.

Turning now to FIG. 2, an illustration of one embodiment of rotation operations is shown. In one embodiment, a processor supports an instruction set architecture (ISA) including operations with both 64-bit and 32-bit operand sizes. For a rotate instruction, an operand may have original operand bit positions 202 as shown in the figure. For a right rotate operation, bits shifted out of the lowermost bits are shifted into the uppermost bit positions as illustrated by the arrow. As appreciated by those skilled in the art, the converse is true for a left rotate operation. For purposes of discussion, operand sizes of 64 and 32 bits will be used. However, in other embodiments, operand sizes other than, or in addition to, these may be supported. In an embodiment configured to support operands of 64 bits, each bit position from 63 to 0 shown in positions 202 that is sent to the rotator may be filled with an associated received input operand bit position. If the operand is a 32-bit operand, the original operand may be stored in original bit positions 0-31 with a corresponding resulting bit stored in bits 0-31 of a result location.

In one embodiment, a 64-bit rotate instruction may correspond to a mode 1 for the processor and a 32-bit rotate instruction may correspond to a mode 0 for the processor. In the example shown, the rotate result bit positions for each of a 64-bit rotate and a 32-bit rotate right operation with a rotate amount of 23 bits are shown in bit positions 204 and 206, respectively. As shown in FIG. 2, each bit position from 8 to 0 in both results 204 and 206 include a same value from the original operand from 31 to 23. In the case of a 64 bit operand (204), the least significant bits of the original operand (bit positions 0-22) are rotated into the most significant bit positions. Additionally, bits 31-9 have been replaced by bits 54-32. However, in the case of a 32 bit operand (206), each of resulting bit positions 31-9 includes a value from a bit position in the original operand with an offset from the bit positions of the 64-bit (mode 1) result 204. For example, rather than holding original bit 54 of the operand (as in the 64 rotate case), bit position 31 in result 206 holds the value from bit position 22 of the original operand. Accordingly, there is a 32-bit offset between the original bit positions in the original operand stored in the results 204 and 206 for selected bits of the result. In particular, the uppermost N bits of the 32 bit operand rotate are offset from the result of the 64 bit operand rotate, where N is equal to the difference in size between the operands (64−32=32). For a left rotate operation, the lowermost N bits of the 32 bit operand would have such an offset.

Continuing with the above rotation examples, for bit positions in result 204 (mode 1), the rotator selects a value in a bit position in the original operand with a distance equal to the rotate amount (23 in this example) from the given bit position in the result 204. For example, for resulting bit position 9, the result 204 holds a value from bit position 9+23=32 in the original operand 202. Similarly, for bit position 30, the result 204 holds a value from bit position 30+23=53 in the original operand 202. For bit positions 8 to 0 in result 206 (mode 0), the same offset is used. For bit position 7, the result 206 (mode 0) holds a value from the bit position 30 in the original operand 202, wherein 30 is 7+23. For values whose sums exceed 63 (the most significant bit position of the original operand), the value returns to 0 (i.e., 64=0, 65=1, etc.). In contrast to a mode 1 rotation, in a mode 0 rotation bit position 9 in the result 206 holds a value from bit position 0 of the original operand 202, where 0 takes position 9+23+32=64 (which resets to 0 as described above). For bit position 30, the result 206 (mode 0) holds a value from bit position 21 in the original operand 202, wherein 21 is 30+23+32 after a wraparound past 63. For bit positions 31 to 9, an additional amount of 32 is added to an index offset to select a correct value from the original operand 202 for the result 206. In other words, the 32 bit rotate is performed based upon a 64 bit rotation size. In this manner, when performing a 32 bit rotate, a 64 bit rotate is (effectively) done and selected bits of the result are repositioned using an offset based on the difference in operand size. Consequently, a single rotator (e.g., one configured to perform 64 bit rotations) may be used or modified to also support rotations for a different operand size (32 bits in this case).

In various embodiments, a mask may be generated and used to in conjunction with the rotator to support operands of differing sizes. For example, as shown in FIG. 2 a mask 208 for a mode 0 rotation is generated and used. In the embodiment shown, the mask has a size which equals that of the operand size to be supported. Other mask sizes could be used as desired. As discussed above, for a right rotate the uppermost N bits of the 32 bit operand rotate are offset from the result of the 64 bit operand rotate, where N is equal to the difference in size between the operands (64−32=32). Accordingly, in one embodiment, a mask is generated which identifies which resulting bits will have such an offset. In the example shown, N most-significant bits in the mask 208 are set to indicate an adjustment is to be performed during rotation (23 bits in this example). The remaining bits (9 bits) in the mask does not indicate this adjustment. Using such a mask, a result for a mode 0 rotate can be achieved. In particular, if a corresponding bit of the mask 208 is set, then the original operand bit for that resulting position is equal to that bit position plus the rotation amount with the offset (result bit position +23+32 in this example). If a corresponding bit of the mask 208 is not set for that position, then the resulting bit is equal to that bit position plus the rotation amount (i.e., no offset).

In FIG. 2, immediately below mask 208 rotate amounts 210 are shown for each of the bit positions. Where the mask has an indication that no adjustment or offset is needed (binary 0 in the mask for this example), then the rotate amount is simply the rotate amount. Where the mask has in indication for that position that an adjustment is to be used, then the rotate amount is adjusted by the adjustment amount (32 in this example). Accordingly, for a rotate amount of 23 in a mode 0 rotation, the uppermost 23 bits will have rotate amounts equal to 23+32=55, while the remaining bits will have rotate amounts of 23. Note that these bits of the mask correspond to the result of the rotation and indicate how far a given bit rotated in order to reach that particular resulting bit position. Accordingly, a mask to indicate how much a given operand bit will need to be rotated would have the least significant bits of the mask set for a right rotate operation.

In various embodiments, a rotator may generally rotate values to the left well. For example, the rotate amount may be 23 bits to the left. For bit position 30, now the result 206 (mode 0) holds a value from bit position 7 in the original operand 202, wherein 7 is 30−23. For bit positions 22 to 0, an additional amount of 32 is added to an offset to select a correct value from the original operand 202 for the result 206. For bit position 9, now the result 206 (mode 0) holds a value from bit position 18 in the original operand 202, wherein 18 is 9−23+32. In such an embodiment, the generated mask 208 (for a left rotate operation) may have a number of least-significant bits set to indicate an adjustment is to be performed during rotation. The remaining number of bits in the mask, which are now the most-significant bits in the mask 208, would indicate such an adjustment/offset is not used.

As will be discussed in greater detail below, in some embodiments a rotate operation may be separated into two or more smaller rotation operations. Such an embodiment may serve to reduce a number of bus wires and capacitance gate loading on lines within selection logic, such as inputs to multiplexers (muxes). For example, in one embodiment, a rotate operation may have a first phase which performs a rotation based on a subset of bits of the rotate amount. For example, a 64-bit processor may use a 6-bit value to hold the rotate amount (giving a rotate amount of 0-63). In such an embodiment, the least-significant 3 bits may be used for the first phase of the rotation operation. In the above example with a right rotate amount of 23 (b'010111), the least-significant subset of 3 bits holds a right rotate amount of 7. In the example of FIG. 2, rather than having the rotate amounts illustrated by amounts 210, to separate rotate amounts are shown in block 220. Block 220 depicts rotate amounts for each of two phases of a rotate operation of 23. In the first phase, the least significant 3 bits provide a rotate amount of 7 bits to all bits. Mask 208 is then used for the second phase rotate. As above, for those where the mask bit is set, an offset is used. Assuming the example of a rotate of 23 wherein the least significant 3 bits have been used for the first phase, the remaining bits of the rotate amount provide a value of 16 ('b010111−b'000111=b'010000=16). For those bits where the mask is not set, this value of 16 represents the remaining rotate amount. For those bits of the mask that are set, the rotate amount is 16+32=48 as shown. Accordingly, the combination of rotate amounts depicted in block 220 is equal to that as shown in rotate amounts 210.

Figure 3:
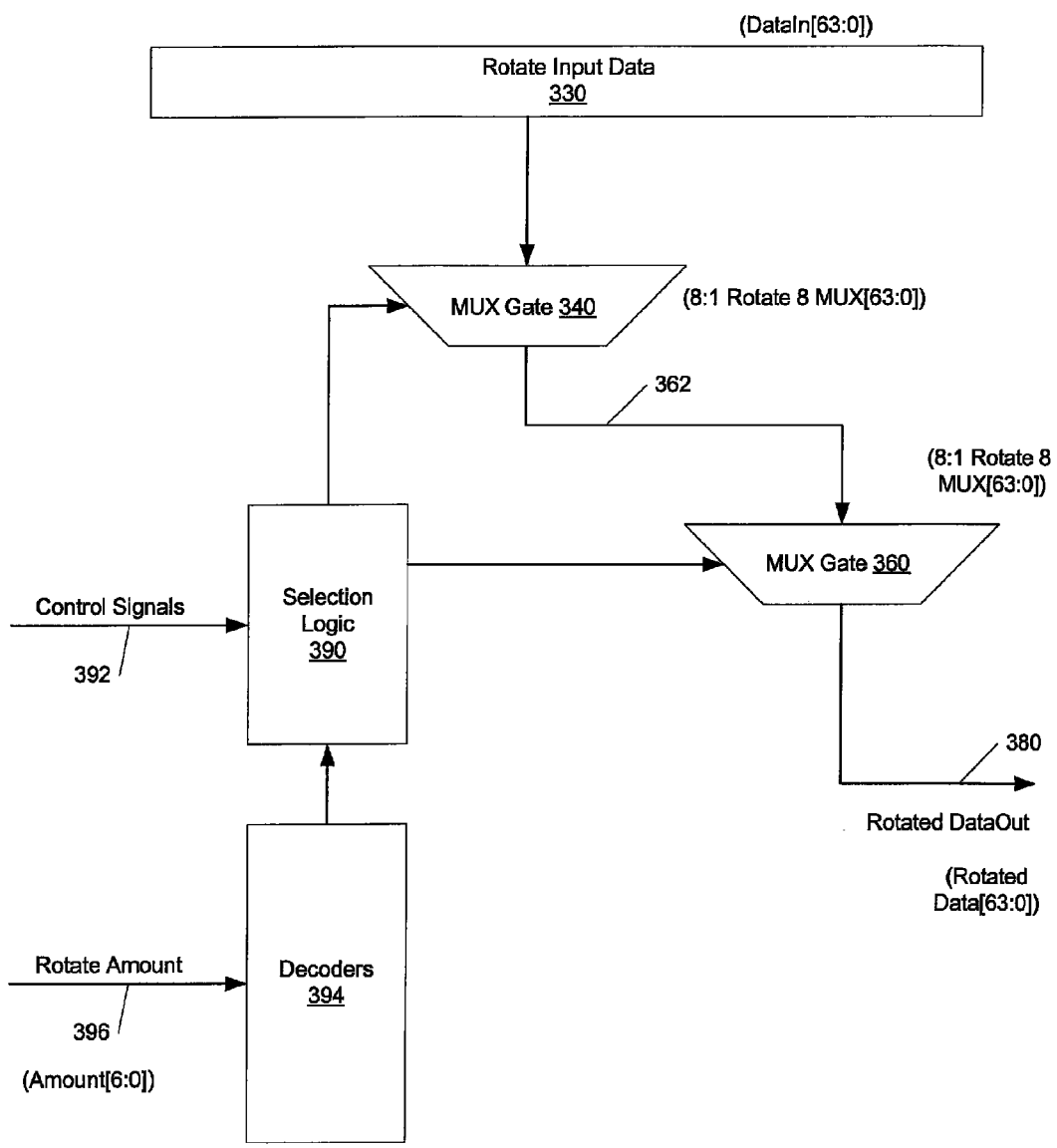
FIG. 3 is a generalized block diagram illustrating one embodiment of a dual-mode rotator.

Turning now to FIG. 3, a generalized block diagram illustrating one embodiment of a dual-mode rotator is shown. In one embodiment, a processor may support an instruction set architecture (ISA) including operations with both 64-bit and 32-bit operand sizes. If an input operand is a 64-bit operand, each bit position from 63 to 0 generally shown in rotate data input 330 is sent to the rotator. If the input operand is a 32-bit operand, each bit position from 31 to 0 within rotate data input 330 may include this 32-bit input operand. In one embodiment, for a 32 bit operand, each bit position from 63 to 32 within the rotate data input 330 may be filled with a don't-care binary value.

The rotator shown in FIG. 3 may be configured to rotate data in the rotate data input 330 by an amount specified by the rotate amount information on line 396. One or more decoders in the decoders 394 may be used to provide select lines for one or more rotate mux gates. Additional control signals may be supplied on line 392, such as a mode signal that indicates a mode 1 rotate operation or a mode 0 rotate operation. Logic within selection logic 390 may include additional logic gates for computing Boolean algebra expressions and smaller muxes for conveying select line values to the rotate mux gates 340 and 360. A further description of one embodiment of these logic structures is provided shortly below.

In one embodiment, the rotator is a two-level or two phase rotator as discussed above. A first level rotate may be performed by the rotate mux gate 340. The rotate mux gate 340 may rotate the data in the rotate data input 330 by an amount represented by a given number of selected bits of the rotate amount on line 396 such as the least-significant 3 bits. The rotated data may be output from the rotate mux gate 340 as an intermediate value on line 362. The rotate mux gate 360 may further rotate this intermediate value on line 362 by an additional amount represented by one or more remaining higher-order bits of the rotate amount on line 396. The rotate data may be output from the rotate mux gate 360 as a rotated output on line 380.

Figure 4:
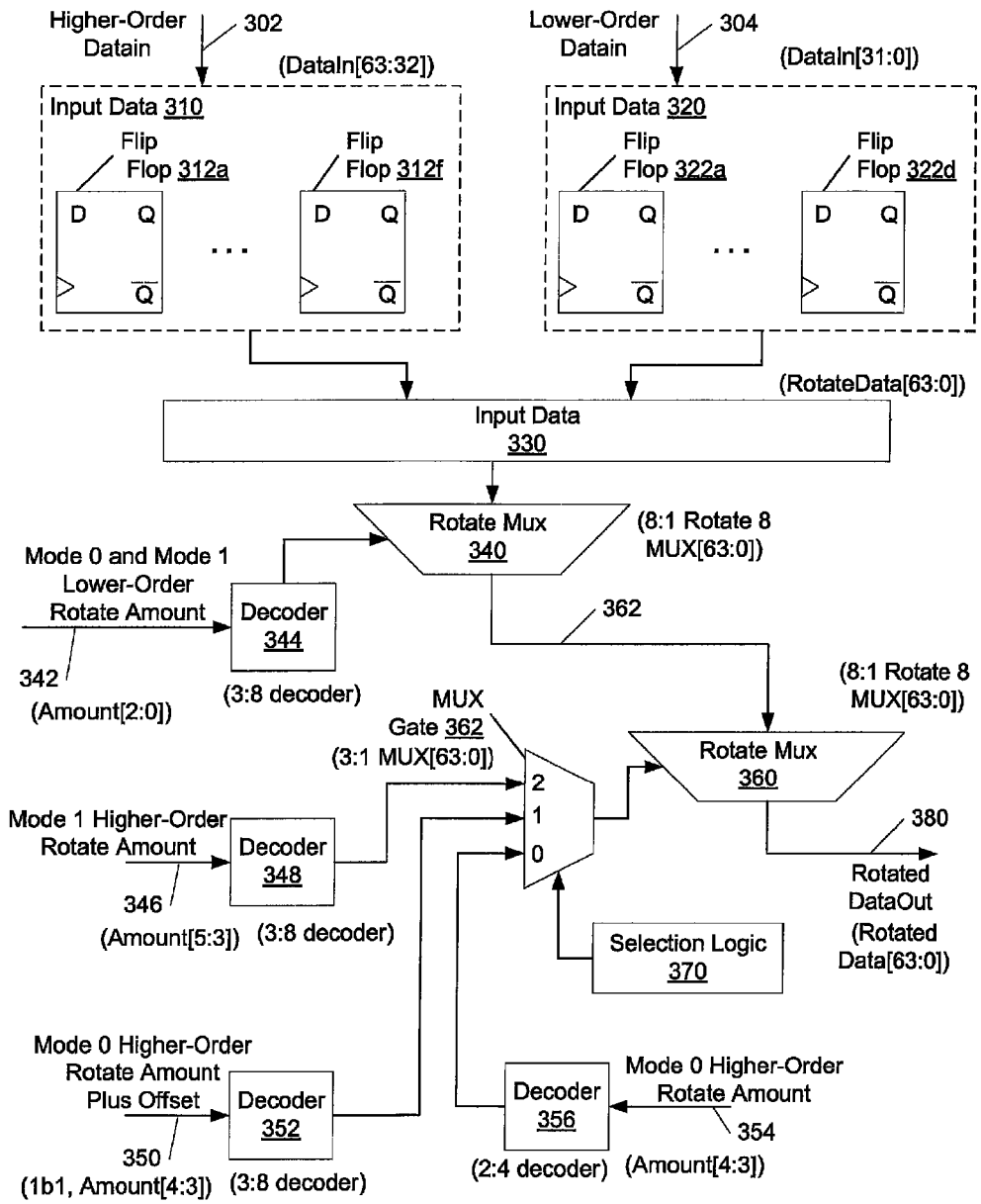
FIG. 4 is a generalized block diagram illustrating another embodiment of a dual-mode rotator.
Figure 5:
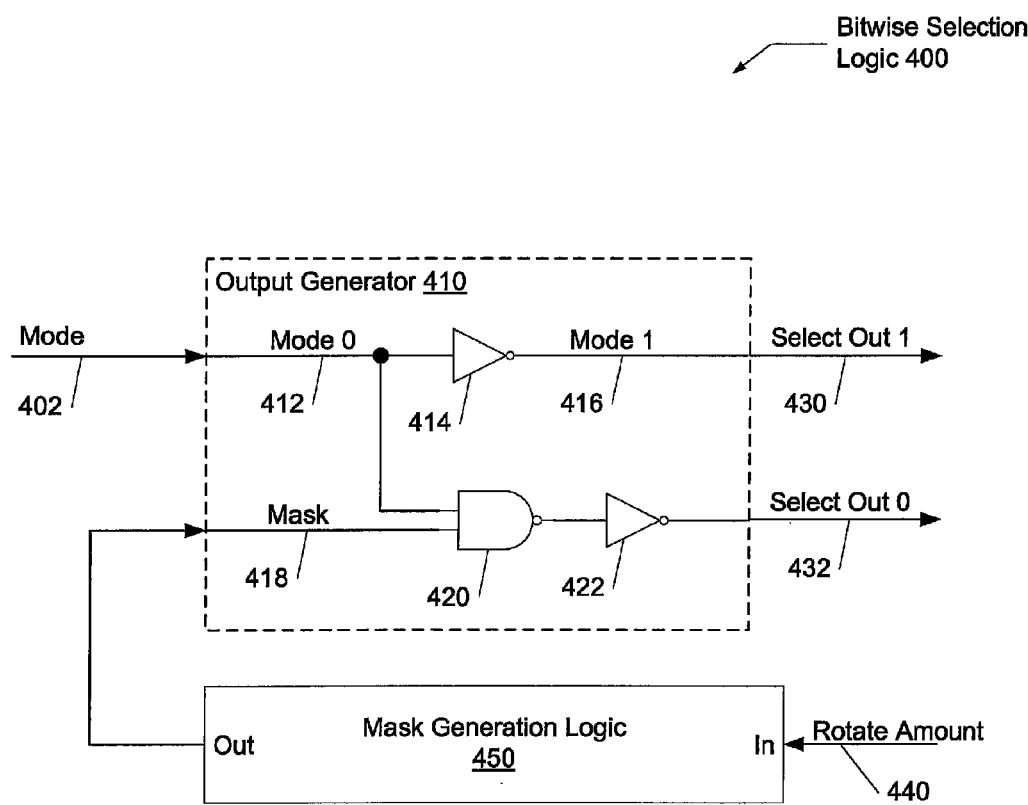
FIG. 5 is a generalized block diagram illustrating one embodiment of bitwise selection logic.
Figure 6:
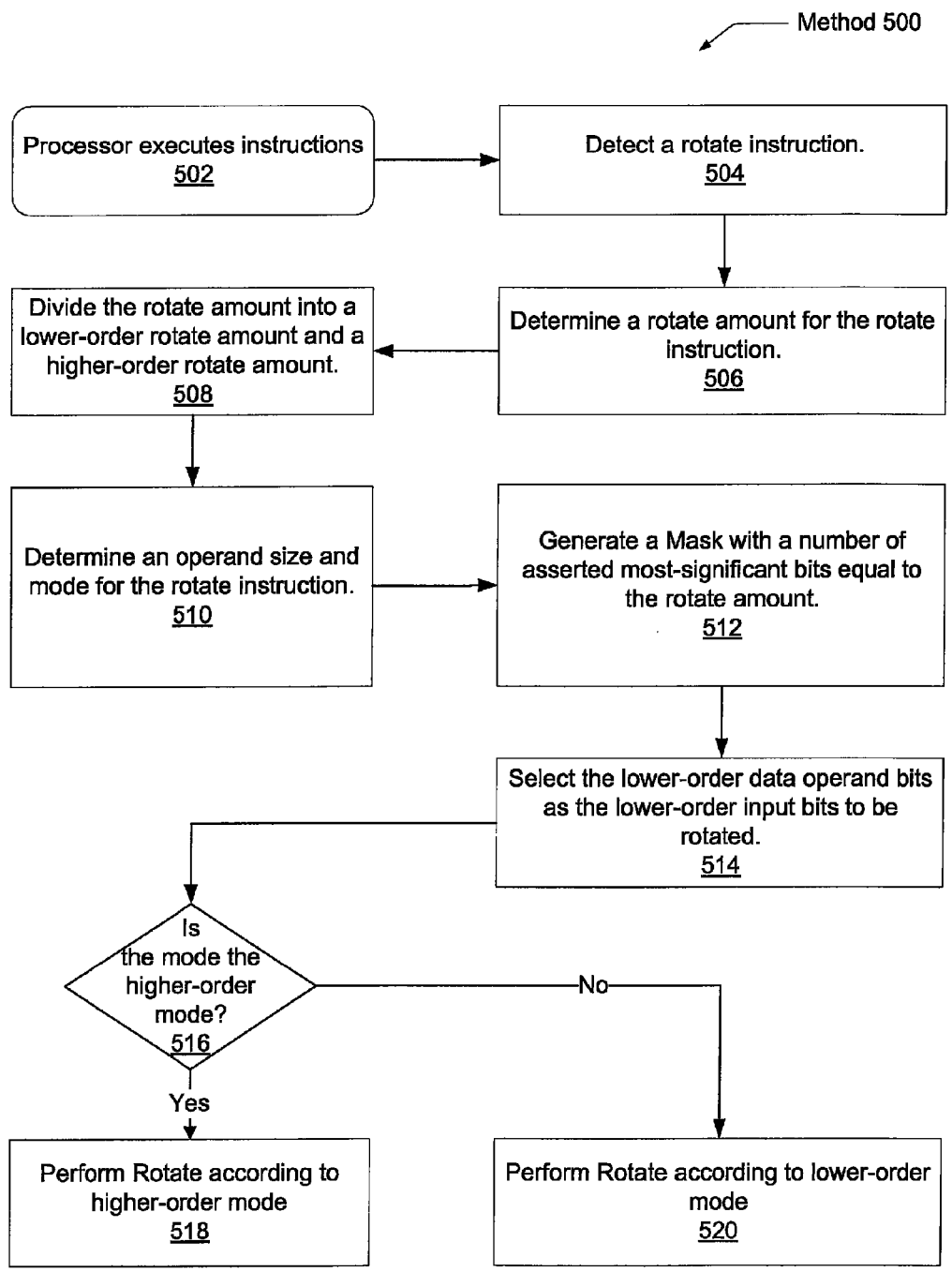
FIG. 6 is a generalized flow diagram illustrating one embodiment of a method for performing dual-mode rotation with a single rotator in a processor.
Figure 7:
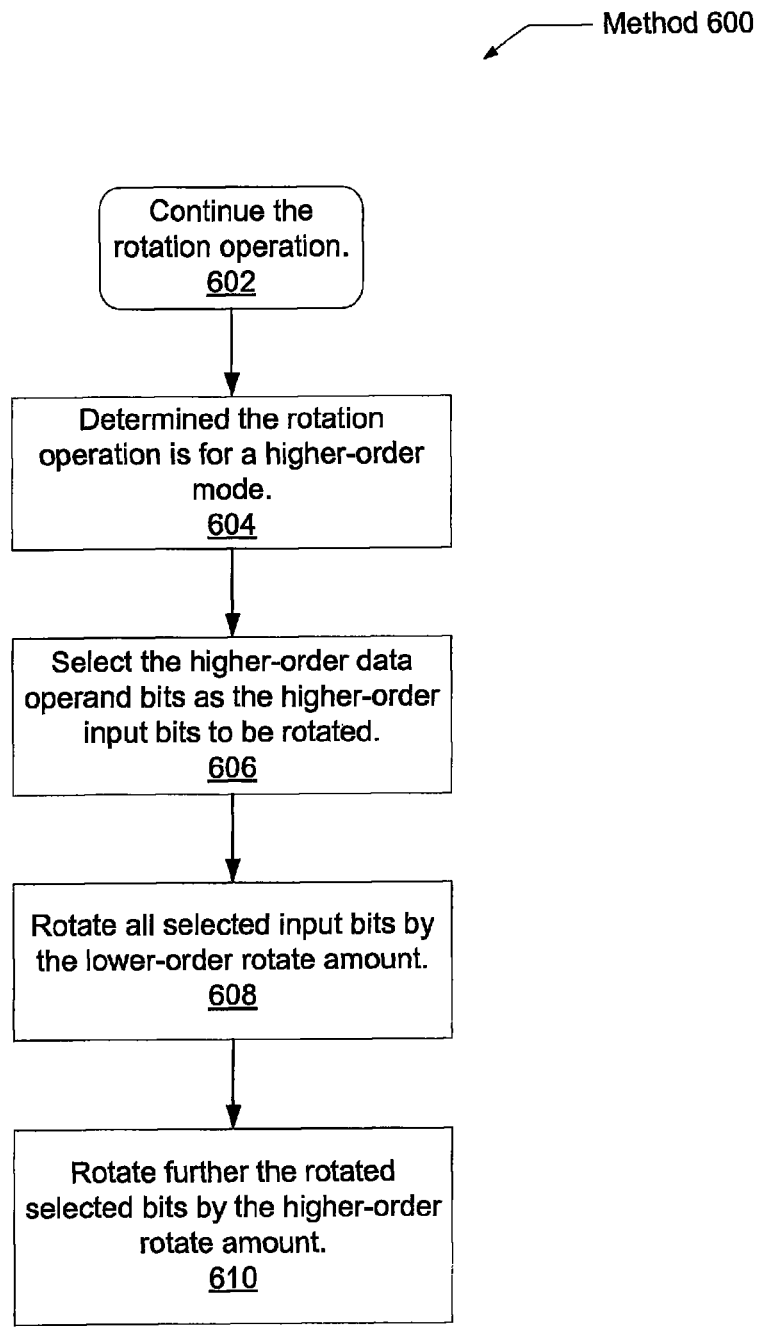
FIG. 7 is a generalized flow diagram illustrating one embodiment of a method for performing a rotate according to a first mode of operation in a dual-mode rotator in a processor.

In the following discussion and figures, examples using a two level rotator as discussed above will be used. However, as previously noted, other embodiments may include fewer than or greater than two levels. FIG. 4 depicts a block diagram illustrating one embodiment of a dual-mode rotator. FIG. 5 depicts a block diagram illustrating one embodiment of bit-wise selection logic 400. FIGS. 5 to 7 illustrate one embodiment of a method for performing a rotate operation. Each of FIGS. 3B and 4 will be described in conjunction with the methods of FIGS. 5 to 7 below. Turning now to FIG. 6, one embodiment of a method 500 for performing dual-mode rotation with a single rotator in a processor is shown. The components embodied in processor 10, the dual-mode rotator shown in FIG. 4 and the bitwise selection logic 400 may generally operate in accordance with method 500. For purposes of discussion, the steps in this embodiment and subsequent embodiments of methods described later are shown in a particular order. However, in other embodiments some steps may occur in a different order than shown, some steps may be performed concurrently, some steps may be combined with other steps, and some steps may be absent.

In block 502, a processor may be executing instructions corresponding to one or more software applications. The processor 10 may fetch instructions concurrently for one or more threads. These fetched instructions are decoded and scheduled for execution. In block 504, the processor 10 detects a rotate instruction. In block 506, the processor 10 determines a rotate amount for the rotate instruction. For ease of discussion, the rotate amount is a right rotate of 23 bits like that of FIG. 2. In block 508, in one embodiment, the processor 10 divides the rotate amount into a lower-order rotate amount and a higher-order rotate amount. The lower-order rotate amount may include a given number of least-significant bits of the rotate amount such as the least-significant 3 bits. The higher-order rotate amount may include a given number of most-significant bits of the rotate amount such as the most-significant 3 bits. In this example, the rotate amount is 23 (represented as bits "010111") with the lower-order rotate amount corresponding to a value of 7 ("111") and the higher-order rotate amount corresponding to a value of 16 ("010000").

Continuing with the rotate amount information, the lower-order rotate amount may be sent on line 342 to decoder 344 of FIG. 4. For a mode 1 (e.g., 32 bit) rotate operation, the higher-order rotate amount may be sent on line 346 to decoder 348. For a mode 0 (e.g., 32 bit) rotate operation, the higher-order rotate amount for its operand size may be sent on both lines 350 and 354 and to decoders 352 and 356, respectively. On line 350, an additional amount may be added to the higher-order rotate amount for a mode 0 rotate instruction. As described earlier, this additional amount may be used to correctly select a bit position of the input operand to successfully complete the rotation operation. In one embodiment, one or more asserted bits may be joined or concatenated with the higher-order rotate amount to add this additional amount. For example, a 1-bit binary value may be joined at bit position 5 with bits 4 and 3 of a higher-order rotate amount in order to add an additional shift value of 32.

In one embodiment, the input operand for the rotate instruction and the rotate amount information may be stored in storage elements, such as flip-flops. As shown in FIG. 4, a 32-bit input operand may be sent on line 304 to be stored in flip-flops 322a-322d. The data input line 302 may include the values already stored in flip-flops 312a-312f. A 2:1 mux (not shown) may be placed in front of each one of the flip-flops 312a-312f to recycle the stored contents or to load a new value. Alternatively, the flip-flops 312a-312f may include load control circuitry. For a 64-bit input operand, both DataIn lines 302 and 304 may be used to load the operand into flip-flops 312a-312f and 322a-322d. Additionally, the rotate amount information on lines 342, 346 and 350 may be stored in flip-flops, but these storage elements are not shown for ease of illustration. A critical path for the rotator shown in FIG. 4 may begin from the storage elements holding the rotate amount information on line 342 and include a hold time for those storage elements. Additionally, the path may include propagation delays through wires and the decoder 344 and each of the rotate muxes 340 and 360. The path may finish with a setup time of storage elements (not shown) that store the output on line 380.

In block 510, the processor 10 determines an operand size mode of two or more modes for the rotate instruction. In one embodiment, the rotator is a dual-mode rotator that supports two operand sizes. Other embodiments may support more than two operand sizes. In one example, the supported operand sizes include 32 bits and 64 bits. If the opcode for the rotate instruction indicates a 32-bit rotate instruction, then the rotator may operate in a mode 0. If the opcode for the rotate instruction indicates a 64-bit rotate instruction, then the rotator may operate in a mode 1. For mode 0, the rotate input data 330 may include the input operand values stored in flip-flops 322a-322d for its lower-order bits. Additionally, the rotate input data 330 may include don't-care values for its upper-order bits. In one example, the don't-care values may include the upper-order bits of a previous input operand stored in flip-flops 312a-312f for a previous rotate instruction.

In block 512, the processor 10 may generate a mask including at least a number of bits equal to a lower-order operand size as described earlier regarding mask 208 shown in FIG. 2. The mask may, for example, be generated in selection logic 370. In block 514, the processor 10 may select the lower-order data operand bits as the lower-order input bits to be rotated as described earlier regarding data input data 330. If the mode of operation for the rotate instruction is the higher-order mode, such as mode 1, (conditional block 516), then in block 518 the higher-order mode rotate operation is performed (with additional details described in FIG. 7). If the mode of operation for the rotate instruction is the lower-order mode (such as mode 0) (conditional block 516), then in block 520 the processor 10 performs the rotate operation according to the lower-order mode (with additional details described in FIG. 8).

Turning now to FIG. 7, additional details concerning one embodiment of a method 600 for performing a higher-order mode of rotation for a dual-mode rotator in a processor is shown. The components embodied in processor 10, the dual-mode rotator shown in FIG. 4 and the bitwise selection logic 400 may generally operate in accordance with method 600. For purposes of discussion, the steps in this embodiment and subsequent embodiments of methods described later are shown in sequential order. However, in other embodiments some steps may occur in a different order than shown, some steps may be performed concurrently, some steps may be combined with other steps, and some steps may be absent.

In block 602, the processor 10 continues the rotation operation started in method 500. In block 604, the processor 10 determines the rotation operation is for a higher-order mode, such as a 64-bit rotation. In block 606, the rotator selects the higher-order input operand bits as the higher-order input bits to be rotated. For example, the higher-order 32 bits of the rotate input data 330 may include the new input operand values stored in flip-flops 312a-312f.

In block 608, the rotator rotates the entire 64-bit input operand by an amount specified by the lower-order rotate amount. For example, the input operand is rotated by 7 bits to the right. This rotation is performed by the rotate mux gate 340 and the decoded output from the decoder 344 coupled to the select lines of the rotate mux gate 340. The intermediate rotated value is output from the rotate mux gate 340 onto the wires represented by line 362.

In block 610, the rotator further rotates the intermediate value by the higher-order rotate amount. For example, the intermediate value is rotated by 16 bits to the right. This rotation is performed by the rotate mux gate 360 and the decoded output from the decoder 348 coupled to the mux gate 362, which has its output coupled to the select lines of the rotate mux gate 360. The rotation result is output from the rotate mux gate 360 onto the wires represented by line 380.

Turning to FIG. 5, the select 1 output line 430 may be used to choose the higher-order rotate amount for a mode 1 rotate operation. For example, if a mode control signal indicates a logic low value for the data input line 402, then the output line 430 becomes a logic high value due to the inverter 414. The input line 412 coupled to the inverter 414 is also coupled to the data input line 402. The output of line 416 coupled to the output of the inverter 414 is also coupled to the select output line 430. A logic high value on the output line 430 may indicate a mode 1 operation is being performed. Both output lines 430 and 432 may be coupled to the select lines of mux gate 362. Alternatively, the mux gate 362 shown in FIG. 4 may be implemented as two 2:1 muxes. A first output mux may receive a control signal on its select line, wherein the control signal indicates whether or not a mode 1 operation is being performed. If the control signal is asserted, then the output from the decoder 348 is chosen as its output. If this control signal is deasserted, then the output from a second mux may be chosen as its output. The second mux may receive the outputs of the decoders 352 and 356 as its inputs. Numerous such embodiments are possible and are contemplated.

Figure 8:
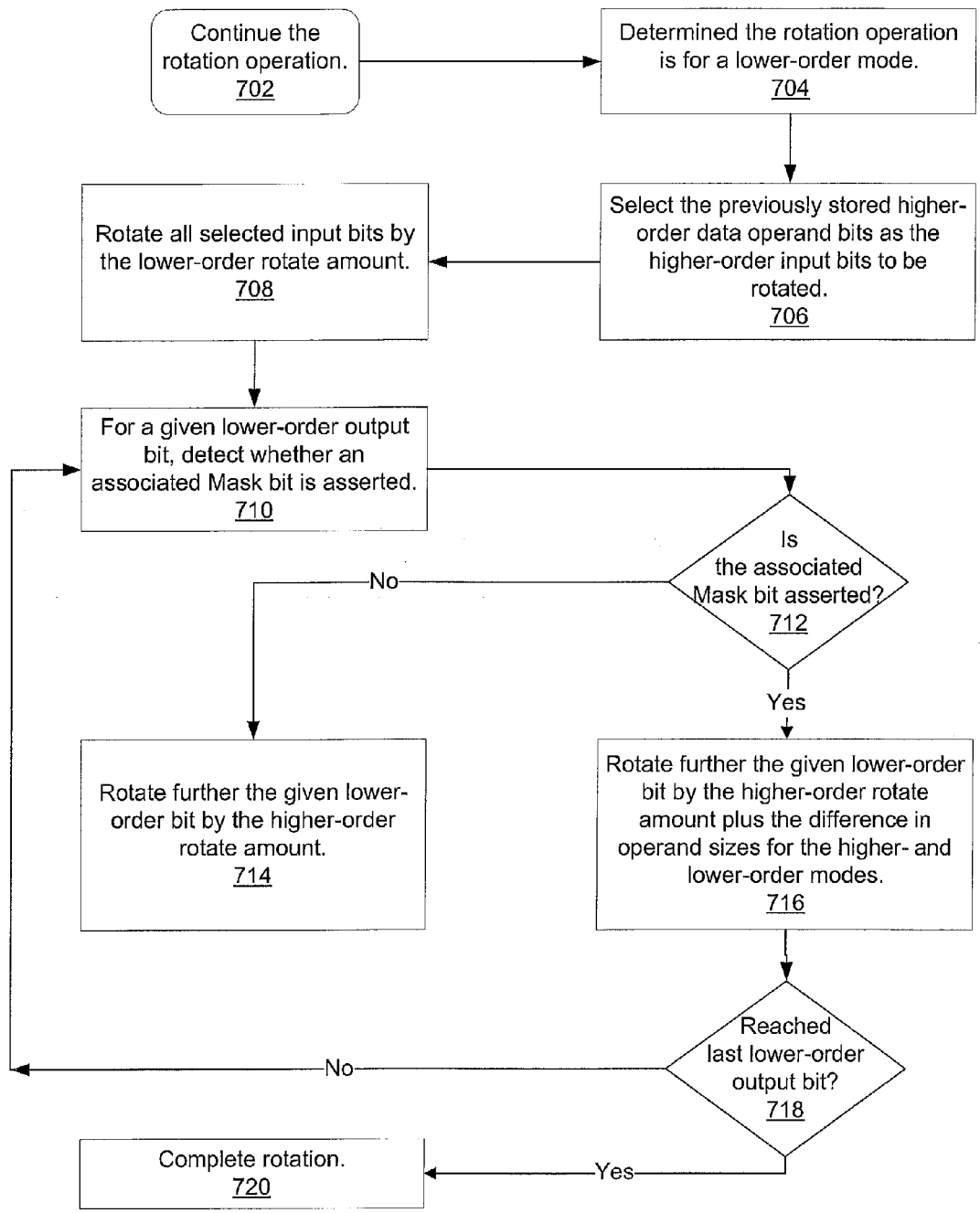
FIG. 8 is a generalized flow diagram illustrating one embodiment of a method for performing a rotate according to a second mode of operation in a dual-mode rotator in a processor.

Turning now to FIG. 8, additional details concerning one embodiment of a method 700 for performing a lower-order mode of rotation for a dual-mode rotator in a processor is shown. In block 702, the processor 10 continues the rotation operation started in method 500. In block 704, the processor 10 determines the rotation operation is for a lower-order mode, such as a 32-bit rotation. In block 706, the rotator may select don't-care values for the higher-order bits of the rotate input data 330. In one embodiment, the previously stored higher-order data operand bits held in flip-flops 312a-312f may be used as the higher-order input bits to be rotated.

In block 708, the rotator rotates the entire 32-bit input operand by an amount specified by the lower-order rotate amount. For example, the input operand is rotated by 7 bits to the right. This rotation is performed by the rotate mux gate 340 and the decoded output from the decoder 344 coupled to the select lines of the rotate mux gate 340. The intermediate rotated value is output from the rotate mux gate 340 onto the wires represented by line 362.

In block 710, for a given lower-order output bit, the rotator detects whether an associated mask bit is asserted. For example, in FIG. 5 the select 0 output line 432 may be used to choose the higher-order rotate amount for a mode 0 rotate operation. If a mode control signal indicates a logic high value for the data input line 402, then the output of the logic AND gate including the NAND gate 420 and the inverter 422 may depend on the output of the mask generation logic 450. If the mask line 418 coupled to the output of the mask generation logic 450 is asserted, then the select output line 432 becomes a logic high value and indicates a mode 0 operation used an additional amount for rotation. Alternatively, if the mask line 418 is deasserted, then the select output line 432 becomes a logic low value, which indicates a mode 0 operation does not use an additional amount for rotation.

In the embodiment shown, mask generation logic 450 receives the rotate amount 440. In one embodiment, the rotate amount 440 uses only a subset of bits of a rotate amount for a mode 0 rotate operation. For example, only 5 bits of a 6-bit rotate amount may be placed on line 440 for a 32-bit mode 0 operation. The mask generation logic 450 may generate the mask value described earlier regarding the mask 208 shown in FIG. 2.

If an associated mask bit is not asserted (conditional block 712), then in block 714, the rotator further rotates the intermediate value by a higher-order rotate amount without an additional amount. For example, the intermediate value is rotated by 16 bits to the right. This rotation is performed by the rotate mux gate 360 and the decoded output from the decoder 356 coupled to the mux gate 362, which has its output coupled to the select lines of the rotate mux gate 360. The rotation result is output from the rotate mux gate 360 onto the wires represented by line 380. Referring again to FIG. 2, the bit position 7 of the rotate result holds a value from the bit position 30 in the original operand 202, wherein 30 is 7+7+16.

If an associated mask bit is asserted (conditional block 712), then in block 716, the rotator further rotates the intermediate value by a sum of the higher-order rotate amount and an additional amount. For example, the intermediate value is rotated by (16+32) bits to the right. This rotation is performed by the rotate mux gate 360 and the decoded output from the decoder 352 coupled to the mux gate 362, which has its output coupled to the select lines of the rotate mux gate 360. The rotation result is output from the rotate mux gate 360 onto the wires represented by line 380. Referring again to FIG. 2, the bit position 30 of the rotate result holds a value from the bit position 21 in the original operand 202, wherein 21 is 30+7+16+32 after a wraparound past 63.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
  detecting a rotate instruction indicating a rotate amount;
  in response to determining an operand of the rotate instruction corresponds to a first size, performing a rotate operation on the operand corresponding to the rotate amount;
  in response to determining the operand corresponds to a second size:
    performing a rotate operation on a first subset of bits of the operand in an amount equal to the rotate amount, the first subset of bits being a number of bits equal to a difference between the operand size and the rotate amount; and
    performing a rotate operation on a second subset of bits of the operand in an amount equal to the rotate amount plus a difference in size between the first size and the second size, the second subset of bits being a number of bits equal to the rotate amount.

2. The method as recited in claim 1, wherein the first size is 64 bits and the second size is 32 bits.

3. The method as recited in claim 1, further comprising:
  generating a mask with a number of bits equal to the rotate amount set; and
  utilizing said mask to identify the second subset of bits of the operand.

4. The method as recited in claim 3, wherein uppermost bits of the mask are set in response to detecting the rotate instruction corresponds to a right rotate, and lowermost bits of the mask are set in response to detecting the rotate instruction corresponds to a left rotate.

5. The method as recited in claim 1, further comprising performing a rotate operation in two phases, wherein a first phase of the two phases comprises rotating the operand a number of bits equal to a subset of least significant bits of the rotate amount to form an intermediate result, and wherein the second phase of the two phases comprises rotating the intermediate result a number of bits equal to a subset of most significant bits of the rotate amount.

6. The method as recited in claim 5, wherein the intermediate result has a size equal to the first size.

7. The method as recited in claim 6, wherein the rotate amount includes six bits, the subset of least significant bits comprises three bits, and the subset of most significant bits includes three bits.

8. An apparatus comprising:
  a decode unit configured to decode instructions; and
  a rotate unit;
  wherein the decode unit is configured to detect a rotate instruction, the rotate instruction indicating a rotate amount;
  wherein in response to determining an operand of the rotate instruction corresponds to a first size, the rotate unit is configured to perform a rotate operation on the operand corresponding to the rotate amount;
  wherein in response to determining an operand of the rotate instruction corresponds to a second size, the rotate unit is configured to:
    perform a rotate operation on a first subset of bits of the operand in an amount equal to the rotate amount, the first subset of bits being a number of bits equal to a difference between the operand size and the rotate amount; and
    perform a rotate operation on a second subset of bits of the operand in an amount equal to the rotate amount plus a difference in size between the first size and the second size, the second subset of bits being a number of bits equal to the rotate amount.

9. The apparatus as recited in claim 8, wherein the first size is 64 bits and the second size is 32 bits.

10. The apparatus as recited in claim 8, further comprising circuitry configured to generate a mask with a number of bits equal to the rotate amount set, wherein the rotate unit is configured to utilize said mask to identify the second subset of bits of the operand.

11. The apparatus as recited in claim 10, wherein uppermost bits of the mask are set in response to detecting the rotate instruction corresponds to a right rotate, and lowermost bits of the mask are set in response to detecting the rotate instruction corresponds to a left rotate.

12. The apparatus as recited in claim 8, wherein the rotate unit is configured to operate in two phases, wherein a first phase of the two phases comprises rotating the operand a number of bits equal to a subset of least significant bits of the rotate amount to form an intermediate result, and wherein the second phase of the two phases comprises rotating the intermediate result a number of bits equal to a subset of most significant bits of the rotate amount.

13. The apparatus as recited in claim 12, wherein the intermediate result has a size equal to the first size.

14. The apparatus as recited in claim 13, wherein the rotate amount includes six bits, the subset of least significant bits comprises three bits, and the subset of most significant bits includes three bits.

15. A method comprising:
   detecting a rotate amount and detecting a received input operand has a size smaller than a supported maximum operand size;
   generating a mask, wherein selected bits of the mask indicate an adjustment is to be performed during rotation;
   generating by a rotator in a processing device a rotation result with a same size as the input operand, wherein for a given rotation result bit position, generating the rotation result comprises:
      selecting a value in the input operand at a bit position with a distance from the given result bit position equal to the rotate amount, in response to detecting an associated mask bit does not indicate said adjustment; and
      selecting a value in the input operand at a bit position with a distance from the given result bit position equal to the rotate amount plus an additional amount, in response to detecting an associated mask bit does indicate said adjustment; and
   storing the rotation result in a storage device.

16. The method as recited in claim 15, wherein the additional amount is equal to a difference between the supported maximum operand size and the input operand size.

17. The method as recited in claim 15, further comprising generating a rotation intermediate value with a same size as the supported maximum operand size, wherein for a given intermediate value bit position, generating the intermediate value comprises selecting a value in the input operand at a bit position with a distance from the given intermediate value bit position equal to a least-significant subset of the rotate amount.

18. The method as recited in claim 15, further comprising:
   selecting a value in the input operand at a bit position with a distance from an associated given intermediate value bit position equal to the remaining subset of the rotate amount, in response to detecting an associated mask bit does not indicate said adjustment; and
   selecting a value in the input operand at a bit position with a distance from an associated given intermediate value bit position equal to the remaining subset of the rotate amount plus said additional amount, in response to detecting an associated mask bit does indicate said adjustment.

19. A processor comprising:
   a fetch control unit configured to fetch instructions from a memory;
   a decode unit coupled to the fetch control unit configured to decode the fetched instructions; and
   an execution core coupled to the decode unit, wherein the execution core comprises a rotator configured to rotate input operands;
   wherein the rotator is configured to:
      detect control signals from the decode unit indicating a received input operand has a size smaller than a maximum operand size supported by the rotator;
      generate a rotation result with a same size as the input operand, wherein for a given rotation result bit position, generating the rotation result comprises:
         select a value in an input operand at a bit position with a distance from the given result bit position equal to the rotate amount, in response to detecting an associated mask bit indicates an adjustment is not required; and
         select a value in an input operand at a bit position with a distance from the given result bit position equal to the rotate amount plus an additional amount, in response to detecting the associated mask bit indicates an adjustment is required.

20. The processor as recited in claim 19, wherein the additional amount is equal to a difference in size between a maximum operand size supported by the processor and the input operand size.

* * * * *